United States Patent [19]
Ieki et al.

[11] Patent Number: 5,969,080
[45] Date of Patent: Oct. 19, 1999

[54] FILM MADE OF AN AROMATIC POLYAMIDE AND/OR AROMATIC POLYIMIDE AND A MAGNETIC RECORDING MEDIUM USING IT

[75] Inventors: Toshiya Ieki; Akimitsu Tsukuda; Toshihiro Tsuzuki, all of Kyoto, Japan

[73] Assignee: Toray Industries, Inc., Japan

[21] Appl. No.: 08/981,759

[22] PCT Filed: May 22, 1997

[86] PCT No.: PCT/JP97/01715

§ 371 Date: Dec. 30, 1997

§ 102(e) Date: Dec. 30, 1997

[87] PCT Pub. No.: WO97/44182

PCT Pub. Date: Nov. 27, 1997

[30] Foreign Application Priority Data

May 22, 1996 [JP] Japan ..................................... 8-126908

[51] Int. Cl.$^6$ ............................. C08G 73/00; B32B 27/00
[52] U.S. Cl. .......................... 528/170; 528/172; 528/173; 528/185; 528/220; 528/229; 528/310; 528/322; 528/332; 528/353; 428/473.5; 428/474.5; 428/900
[58] Field of Search ..................................... 528/310, 332, 528/322, 353, 170, 172, 173, 185, 220, 229; 428/473.5, 474.5, 900

[56] References Cited

U.S. PATENT DOCUMENTS

| 4,910,068 | 3/1990 | Takagi et al. | 428/141 |
|---|---|---|---|
| 5,324,475 | 6/1994 | Okahashi et al. | 264/555 |
| 5,460,890 | 10/1995 | Okahashi et al. | 428/458 |
| 5,686,166 | 11/1997 | Tsukuda et al. | 428/141 |

*Primary Examiner*—P. Hampton-Hightower
*Attorney, Agent, or Firm*—Austin R. Miller

[57] ABSTRACT

A film excellent in flatness, and not degraded in flatness by curling, etc. even at high temperature during processing and use as a product.

The film of the present invention is made of an aromatic polyamide and/or aromatic polyimide, and satisfies the following:

$$(Pmax-Pmin)/Pavr \leq 1.0$$

where Pmax is the maximum value of the orientation degree obtained from the Raman spectrum in the section direction of the film; Pmin is the minimum value and Pavr is the average value.

16 Claims, No Drawings

FILM MADE OF AN AROMATIC POLYAMIDE AND/OR AROMATIC POLYIMIDE AND A MAGNETIC RECORDING MEDIUM USING IT

TECHNICAL FIELD

The present invention relates to a film made of an aromatic polyamide and/or aromatic polyimide. In more detail, it relates to a film made of an aromatic polyamide and/or aromatic polyimide free from curling and excellent in flatness.

BACKGROUND ARTS

It is conventionally proposed to use films made of an aromatic polyamide and/or aromatic polyimide as base films for magnetic recording media, flexible printed boards, heat sensitive transfer films, etc. since they are excellent in mechanical properties and heat resistance. The base films used in these applications are required to have a flat surface free from curling and wrinkles since the yield in processing and the functions as products are adversely affected.

It is proposed to use them as base films for magnetic recording media such as video tapes and data memory tapes which are densified especially in recent years. In these applications, the films are exposed to high temperatures when the magnetic layer is dried after coating or vapor-deposited, and they are curled or wrinkled to be poor in flatness. So, the tapes produced from them are wound in awkward styles or touch the head imperfectly, not allowing sufficient electromagnetic conversion characteristics to be obtained disadvantageously.

DISCLOSURE OF THE INVENTION

The present invention provides a film which is not degraded in film flatness by the curling caused during film production or even by the curling, etc. caused in severe conditions during film processing or use.

The object of the present invention can be achieved by a film made of an aromatic polyamide and/or aromatic polyimide, characterized by satisfying the following relation:

$$(Pmax-Pmin)/Pavr \leq 1.0$$

where Pmax is the maximum value of the orientation degree obtained from the Raman spectrum in the section direction of the film, Pmin is the minimum value and Pavr is the average value.

BEST MODE FOR CARRYING OUT THE INVENTION

The aromatic polyamide used in the present invention contains the repeating units expressed by the formula (I) and/or (II) preferably in an amount of not less than 50 mol %, more preferably not less than 70 mol %.

General formula (I)

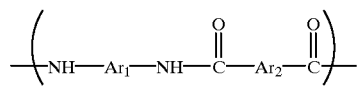

General formula (II)

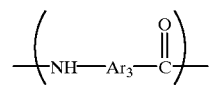

wherein $Ar_1$, $Ar_2$ and $Ar_3$ represent, for example,

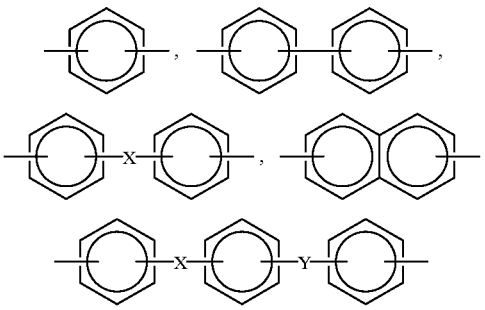

wherein X and Y represent —O—, —CH$_2$—, —CO—, —SO$_2$—, —S—, —C(CH$_3$)2— or the like, although $Ar_1$, $Ar_2$ and $Ar_3$ are not restricted to those described above. Furthermore, those with some of hydrogen atoms on these aromatic rings substituted by halogen groups such as chlorine, fluorine or bromine (particularly chlorine), nitro groups, alkyl groups such as methyl groups, ethyl groups and propyl groups (particularly methyl groups), alkoxy groups such as ethoxy groups, methoxy groups, propoxy groups and isopropoxy groups are also included, and furthermore, those in which the hydrogen atoms in the amide bonds constituting the polymer are substituted by other groups are also included.

In view of properties, a polymer in which the above aromatic rings connected at the para position account for 50% or more of all the aromatic rings is preferable since a film with good thermal dimensional stability and high elastic modulus can be obtained, and more preferable is 75% or more. Furthermore, it is more preferable for a smaller moisture absorption that aromatic rings with some of hydrogen atoms on them substituted by halogen groups (particularly chlorine) account for 30% or more of all the aromatic rings. More preferable is 50% or more, and further more preferable is 70% or more.

The aromatic polyamide which may be used in the present invention contains the repeating unit represented by the above-described formula (I) and/or formula (II) in an amount of not less than 50 mol %. The remaining less than 50 mol % may be the repeating units other than aromatic amide units by the way of copolymering and/or polymer-blending.

The aromatic polyimide used in the present invention contains one or more aromatic rings and imido rings in the repeating units, and preferably contains the repeating units expressed by the formula (III) and/or (IV) preferably in an amount of not less than 50 mol %, more preferably not less than 70 mol %.

General formula (III)

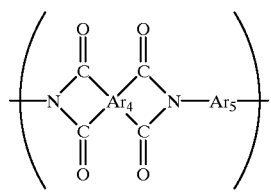

General formula (IV)

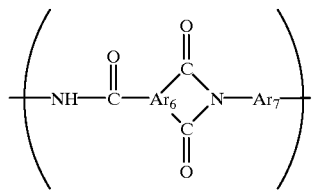

In these formula, $Ar_4$ and $Ar_6$ contain at least one aromatic ring, respectively, and the two carbonyl groups constituting imido ring are bonded to juxtaposed carbon atoms in the aromatic ring. $Ar_4$ is originated from an aromatic tetracarboxylic acid or anhydride thereof. Representative examples of $Ar_4$ include the following:

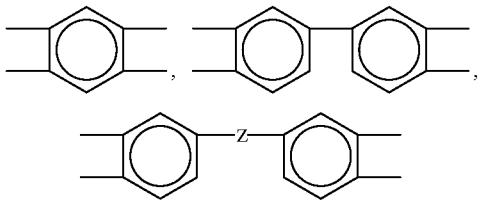

where Z is selected from, though not limited to, —O—, —CH$_2$—, —CO—, —SO$_2$—, —S—, —C(CH$_3$)$_2$—, etc.

$Ar_6$ is originated from a carboxylic acid anhydride or a halide thereof. Examples of $Ar_5$ and $Ar_7$ include

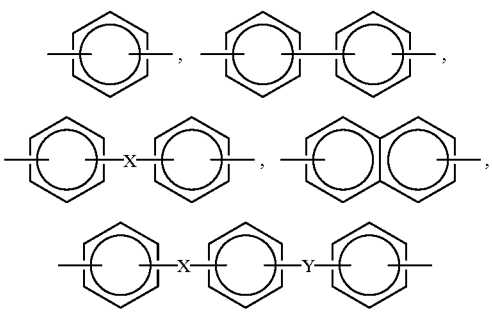

wherein X and Y are selected from the group consisting of —O—, —CH$_2$—, —CO—, —SO$_2$—, —S—, —C(CH$_3$)$_2$—, and the like, although X and Y are not restricted thereto. Furthermore, those with some of hydrogen atoms on these aromatic rings substituted by halogen groups such as chlorine, fluorine or bromine (particularly chlorine), nitro groups, alkyl groups such as, methyl groups, ethyl groups and propyl groups (particularly methyl groups), alkoxy groups such as ethoxy groups, methoxy groups, propoxy groups and isopropoxy groups are also included, and furthermore, those in which the hydrogen atoms in the amide bonds constituting the polymer are substituted by other groups are also included.

The aromatic polyimide which may be used in the present invention contains the repeating unit represented by the above-described formula (III) and/or formula (IV) in an amount of not less than 50 mol %. The remaining less than 50 mol % may be the repeating units other than aromatic imide units by the way of copolymerizing and/or polymer-blending.

The aromatic polyamide and/or aromatic polyimide of the present invention can have a lubricant, antioxidant and other additives blended to such an extent not to impair the physical properties of the film.

In the present invention, the maximum value Pmax of the orientation degree obtained from the Raman spectrum in the section direction of the film, the minimum value Pmin and the average value Pavr satisfy the following relation:

$$(Pmax-Pmin)/Pavr \leq 1.0$$

A film with the (Pmax−Pmin)/Pavr kept in this range is hard to cause flatness degradation such as curling or waving during film production. It can also keep good flatness even against temperature changes during and after film processing. For example, even in the drying step after magnetic layer coating or in vapor deposition of making process for magnetic recording medium, flatness degradation such as curling does not occur, and a high output can be obtained from the produced magnetic tape.

It is preferable that (Pmax−Pmin)/Pavr is 0.7 or less, and more preferable is 0.5 or less in view of more remarkable effect.

Furthermore, when a section of a film is divided into two halves at the center line, it is preferable to satisfy the following relation:

$$Pa/Pb \leq 1.5$$

where Pa is the average orientation degree of one half and Pb is the average orientation degree in the remaining half (Pa≧Pb), since the curling of the film obtained by molding and the curling caused by exposure to high temperatures during processing and use are harder to occur. It is more preferable that Pa/Pb is 1.3 or less, and further more preferable is 1.1 or less.

It is preferable that the average orientation degree Pavr in the section direction of the film is 4.0≦Pavr≦15 to let the film have moderate rigidity in view of the handling convenience during processing and processability. More preferable is 6.0≦Pavr≦10.

As described above, the homogeneity in the thickness direction of the film is most important for the flatness during production and for the flatness during processing and use. Furthermore, it is preferable that the dimensional stability of the entire film is good since the processability of the film improves.

That is, it is preferable that the heat shrinkage at 220° C. of the film of the present invention is 5% or less at least in one direction, preferably in all directions in view of the prevention of flatness degradation such as curling caused during processing.

It is preferable that the thickness of the film of the present invention is 0.1 to 150 μm. More preferable is 1 to 80 μm, and further more preferable is 0.1 to 20 μm.

The film of the present invention may contain particles to let the film have moderate running property. The size and amount of the particles to be contained can be selected to suit each application. It is preferable that the average primary particle size is 0.01 to 2 µm in view of the adhesiveness to the composite, the adhesion between the magnetic tape obtained from it and the magnetic head and the electromagnetic conversion characteristics. Furthermore, it is also preferable from similar points of view that the amount of the particles contained in the film is 0.001 to 5 wt %, and more preferable is 0.05 to 3 wt %.

The particles include inorganic particles such as $SiO_2$, $TiO_2$, $Al_2O_3$, $CaSO_4$, $BaSO_4$, $CaCO_3$, carbon black, zeolite and other metallic powers, and organic polymer particles such as silicone particles, polyimide particles, crosslinked copolymer particles, crosslinked polystyrene particles and teflon particles. Inorganic particles are preferable in heat resistance.

The surface roughness of the film should be properly designed to suit each application. For magnetic recording, it is preferable that the center line average roughness Ra measured at 0.008 µm cut-off according to JIS-B-0601-1976 is 0.1 to 100 nm, and that the ten-point average roughness Rz is 0.5 to 500 nm. More preferable are 0.2 to 50 nm and 1 to 400 nm respectively.

It is preferable that the moisture absorption of the film of the present invention is 3.5% or less in view of the prevention of dimensional change and flatness degradation due to moisture absorption and the prevention of degradation of electromagnetic conversion characteristics as a magnetic tape. More preferable is 2.5% or less.

It is preferable that the elongation of the film of the present invention is 10% or more, and more preferable is 20% or more, since the tape has moderate flexibility and is excellent in processability.

It is preferable that the tensile modulus of the film of the present invention is 6 GPa or more in both machine and transverse directions, and more preferable is 8 GPa or more since even if the film is thinner, it is easy to handle, and since the magnetic tape obtained from it is good in touch to the head and good also in electromagnetic conversion characteristics.

The film of the present invention can of course be a single-layer film, and can also be a laminate film.

The film of the present invention can be used for various applications such as flexible printed boards, heat sensitive transfer ribbons, capacitors and base films of magnetic recording media.

When used as a base film of a magnetic recording medium, the film is coated with a magnetic layer on one side or both sides, to make a magnetic recording medium.

The magnetic layer of a magnetic tape can be formed by coating a substrate film with a magnetic coating material obtained by mixing a ferromagnetic powder of iron oxide, chromium oxide, Fe, Co, Fe—Co, Fe—Co—Ni or Co—Ni, etc. and any of various binders, or a vacuum thin film formation method such as vapor deposition, sputtering or ion plating. The method is not limited to those enumerated here. However, the film of the present invention is especially effective in a vacuum thin film formation method in which the film is exposed to a high temperature during production.

Furthermore, after forming a magnetic layer, a back coat layer can also be formed on the side opposite to the magnetic layer by any publicly known method, to further improve the running property.

Thus, a film with a magnetic layer formed is slit at a predetermined width to make a magnetic recording medium.

A magnetic tape with a thickness of 6.5 µm or less, a width of 2.3 to 13.0 and a recording density (in the non-compressive state) of 8 kilobytes/mm² or more produced from the film of the present invention is preferable since the effect of the film can be sufficiently manifested. The recording density in this case is obtained by dividing all the recording capacity per cassette by the (length×width) of the magnetic tape.

It is preferable that the thickness of the substrate is 4.5 µm or less, and more preferable is 3.5 µm or less. It is more preferable that the recording density as a magnetic recording medium is 25 kilobytes/mm² or more, and further more preferable is 34 kilobytes/mm² or more.

Magnetic recording media such as magnetic tapes are demanded to be smaller in size and higher in capacity in recent years, and to achieve a higher capacity, the following methods are available. One method is to improve the recording capacity as a whole by adopting a thinner and longer substrate. The other method is to improve the recording capacity per unit area by narrowing the track width and shortening the recording wavelength. In general, these two methods tend to be used together. When a thinner substrate is used, the substrate is of course required to have higher rigidity, but the influence of flatness degradation tends to be larger than with a thicker substrate. Furthermore, if the track width is more narrow or the recording wavelength is shorter, more accurate flatness than before is required. That is, even slight partial degradation of a magnetic tape can cause dislocation and may cause missing of data. The magnetic tape obtained by using the film of the present invention can favorably meet the demand for such a higher capacity since it is good in flatness. Preferable applications of the magnetic recording medium obtained like this include, though not limited to, 8 mm films, digital video cassettes, etc. for household and professional use, D-1, 2, 3, etc. for broadcasting, and DDS-2, 3 and 4, QIC, data 8 mm film for data storage. The magnetic recording medium can be especially suitably used for data storage in which the reliability against missing of data, etc. is important.

The method for producing the film of the present invention is described below as examples.

In cases where the aromatic polyamide is prepared from an acid chloride and a diamine, the aromatic polyamide may be synthesized by solution polymerization in an aprotic organic polar solvent such as N-methylpyrrolidone (NMP), dimethylacetamide (DMAc) or dimethylformamide (DMF), or by interfacial polymerization in an aqueous medium. If an acid chloride and a diamine are used as monomers, hydrogen chloride is produced as a by-product. In cases where the generated hydrogen chloride is neutralized, an inorganic neutralizing agent such as calcium hydroxide, calcium carbonate or lithium carbonate; or an organic neutralizing agent such as ethylene oxide, propylene oxide, ammonia, triethylamine, triethanolamine or diethanolamine may be used. The reaction between an isocyanate and a carboxylic acid is carried out in an aprotic organic polar solvent in the presence of a catalyst.

The polymer solution may be used as the film-forming solution as it is. Alternatively, the polymer is once separated from the solution and the polymer is dissolved again in the above-mentioned organic solvent or in an inorganic solvent such as sulfuric acid to form a film-forming solution.

It is preferable that the inherent viscosity ηinh of the polymer used for obtaining the aromatic polyamide film of the present invention (measured as a 100 ml solution with 0.5 g of the polymer dissolved in 98% sulfuric acid at 30° C.) is 0.5 or more.

On the other hand, solution of the aromatic polyimide or polyamic acid can be obtained as follows. That is, polyamide acid can be prepared by reacting a tetracarboxylic acid dianhydride with an aromatic diamine in an aprotic organic polar solvent such as N-methylpyrrolidone (NMP), dimethylacetamide(DMAc) or dimethylformamide (DMF). The aromatic polyamide may be prepared by heating the above-described solution of polyamic acid, or by adding an imiding agent such as pyridine to obtain powder of polyimide and then dissolving the powder in a solvent.

The particles may be added by throughly mixing the particles with a solvent to form a slurry and using the obtained slurry as solvent for polymerization or for dilution; or the particles may be directly added to the film-forming solution after preparing the film-forming solution.

To the film-forming solution to be formed into a film, an inorganic salt such as calcium chloride, magnesium chloride, lithium chloride or lithium nitrate, etc. may be added as a dissolving aid. It is preferable that the polymer concentration in the film -forming solution is about 2 to 40 wt %.

The film-forming solution prepared as described above is formed into a film by the so-called solution casting process. The solution casting process includes the dry-wet method, dry method, wet method, etc., and any of the methods can be used. However, if an inorganic salt is contained in the polymer solution, a wet process is necessary for extracting it, and either the dry-wet method or wet method is used.

Desirable methods for obtaining an aromatic polyamide film and/or aromatic polyimide film in which (Pmax–Pmin)/Pavr and Pa/Pb satisfy the ranges of the present invention include the following. As one method, the film is formed by controlling the solvent removing rate during film formation in a certain range described later, and as another method, the difference in the solvent removing rate from both sides of the film is minimized. It is of course desirable to combine both the methods. Further other preferable methods include keeping the difference in the peripheral speed of the drive rolls and free rolls of the nip rolls used for production within 0.5%, and keeping the difference in the heat treatment temperature between both sides of the film within 3° C.

In the case of film formation by the dry-wet method, the film-forming solution is extruded onto a support such as a drum or endless belt from a die, to form a thin film, and from the thin film layer, the solvent is dissipated by drying the thin film layer till the polymer concentration (PC) becomes 35 to 60 wt % at which the film can be self-sustained. To obtain the intended film homogeneous in the thickness direction by this drying, it is preferable that the solvent extracting rate is set at 0.01 to 1 wt %/sec to prevent the rapid solvent extraction from one side of the film. The drying temperature, air velocity and time to achieve it should be properly selected, depending on the polymer composition, concentration and the thickness of the film to be formed. If the solvent extracting rate is larger than 1 wt %/sec, the film is oriented due to the volumetric shrinkage occurring only on one side of the film disadvantageously for the present invention. If less than 0.01 wt %/sec, the film forming speed is extremely low disadvantageously in view of productivity. Keeping the surface temperature of the support at not lower than (hot air temperature−20° C.) is also preferable for keeping (Pmax−Pmin)/Pavr and Pa/Pb in the ranges of the present invention. If the surface temperature of the support is higher than the (hot air temperature−20° C.), the evaporation of the solvent on the support side of the cast film where evaporation is hard to occur can be promoted, to lessen the difference of orientation and the difference of polymer concentration in the film thickness direction caused when the film is separated. It is also effective to heat the solvent from the inside of the film by radiant heat such as infrared rays.

After completion of drying process, the film is cooled, separated from the support, introduced into a wet bath in the subsequent wet process and demineralized, and gets the solvent removed. In this case, to obtain a film homogeneous in the thickness direction, it is important to control the extraction of the solvent from both sides of the film. The film which gets the solvent removed on a belt and separated from the belt may have a solvent content gradient in the thickness direction of the film, and if the film is extracted simultaneously from both sides, the finally obtained film may be heterogeneous in the thickness direction. For example, if the solvent content on the belt side of the film is larger than the solvent content on the air side, the solvent removing rate from the belt side must be kept larger than that on the air side. The solvent extracting rate from one side of the film can be effectively kept larger, for example, by blowing a wet bath solution by a nozzle, etc. onto the film surface, the solvent extraction from which is desired to be promoted, and subsequently introducing the film into the wet bath, or keeping the flow velocity of the wet solution to be applied in the wet bath to the film surface, the solvent extraction from which is desired to be promoted, larger than that to the other film surface, etc. The wet bath composition is not especially limited as far as it is a poor solvent for the polymer, and water or a mixture consisting of an organic solvent and water can be used. The ratio of an organic solvent:water should be 70:30~0:100. A preferable range is 60:40~30:70 since the homogeneity in the thickness direction of the film is better. The wet bath can contain an inorganic salt, but it is preferable to extract the solvent and inorganic salt contained in the film finally by a large amount of water.

For film formation by the wet method, the film-forming solution is directly extruded from a die into a wet bath or extruded once onto a support, to be introduced into the wet bath together with the support. The wet bath composition can be water, organic solvent, inorganic salt aqueous solution or any of their mixtures. It is preferable to adjust the bath composition and temperature to keep the solvent extracting rate at 0.01 to 10 wt %/sec., and a more preferable range is 0.1 to 5 wt %/sec. If the solvent extracting rate is larger than 10 wt %/sec, rapid solvent extraction occurs to impair the homogeneity in the thickness direction, causing the (Pmax−Pmin)/Pavr and Pa/Pb to deviate from the ranges of the present invention, and the film may be devitrified.

Furthermore also in the wet method, it is effective for improving the homogeneity in the thickness direction to control the solvent extraction from both sides of the film separated from the support. Finally, the film is fed through a water bath, to remove the solvent and inorganic salt aqueous solution in the film and on the surfaces of the film.

After completion of wet process, the film is dried and heat-treated in a tenter.

The film formed as described above is drawn in the wet process or in a tenter to improve the mechanical properties. It is preferable that the area drawing ratio is 1.0 to 4.0 times (the area drawing ratio is defined as a value obtained by dividing the area of the film before drawing by the area of the film after drawing).

The draw film is heat-treated to improve thermal dimensional stability and to lower the moisture absorption, and it is preferable that the heat treatment is effected at 200 to 450° C. for 1 second to 5 minutes. In this case, to lessen the difference of orientation degree between both sides of the film, it is preferable that the heat treatment is effected to keep the temperature difference from both sides of the film within 3° C. homogeneously.

The film according to the present invention may be a laminate film. For example, when the film is a bilayered film, the polymerized aromatic polyamide solution is halved and different particles are added to the halved portions, respectively, and the resultants are laminated. Laminate films having three or more layers may be prepared in the similar manner. Lamination of the films can be carried out by well-known methods including methods in which the polymers are laminated in a die, methods in which the polymers are laminated in feed block, and methods in which one layer is first prepared and other layer(s) is(are) laminated thereon.

The film of the present invention can be obtained as described above, but the present invention is not limited thereto or thereby.

The methods for measuring physical properties and evaluating effects in the present invention are described below.

(1) Orientation degree

A film was embedded into an epoxy resin, and a 1 $\mu$m thick section in the width and thickness directions of the film was prepared using a microtome. This section was measured according to the laser Raman microprobe method using the following instrument under the following conditions. The spot diameter of the laser beam was 1 $\mu$m. The section was irradiated with the laser beam with a plane of polarization in parallel to the film surface (i.e., in the width direction), to obtain the intensity (parallel) of the component parallel to the film surface, of the Raman scattered light near 1617 cm$^{-1}$ attributable to the C=C stretching vibration mode of the benzene ring, and irradiated with a laser beam with a polarizing surface vertical to the film surface (i.e., in the thickness direction), to obtain the intensity I (vertical) of component vertical to the film surface, of the Raman scattered light near 1617 cm$^1$. The intensity ratio P=I (parallel)/I (vertical) was adopted as the orientation degree. Measurement was carried out at 4 or more points of 1 $\mu$m intervals in the film thickness direction. When the film thickness was less than 4 $\mu$m, measurement was carried out at 4 or more points of equal intervals. The maximum value of the obtained P values was adopted as Pmax, the minimum value, as Pmin, and the average value of all the measured values as Pavr. The average value of one half obtained by dividing the film at the center line in the thickness direction was adopted as Pa, and the average value of the other half, as Pb (Pa$\geq$Pb).

Instrument: Ramanor T-64000 (produced by Jobin Yvon)
Light source: Ar laser (NEC GLG3460 5145A)

(2) Heat shrinkage

A film sample with a width of 10 mm and a test length of 200 mm was obtained, heated in a 220° C. oven for 10 minutes, taken out, and allowed to cool. The heat shrinkage was calculated from the following formula:

Heat shrinkage (%)=(Test length–Length after heating)/Test length×100

(3) Elastic modulus and elongation

A tensile tester produced by Orientec was used to measure the elastic modulus and elongation of a film with a width of 10 mm and a length of 50 mm at a tensile speed of 300 mm/min.

(4) Moisture absorption

The weight of the film dried at 150° C. for 60 minutes (W1) and the weight of the film obtained by allowing the film to stand at 75% RH for 48 hours (W2) were measured, and the coefficient of moisture absorption was calculated from the following formula:

Moisture absorption (%)=(W2–W1)/W1×100

(5) Solvent extracting rate

A polymer solution was extruded onto a support, and the average solvent decrease rate in the film from start of solvent extraction till the film could be separated with self-sustainability was adopted as the solvent extracting rate.

The solvent extracting rate was obtained from the following formula:

Solvent extracting rate (wt %/sec)=(SC1–SC2)/t where SC1 (wt %) is the solvent content of the raw polymer solution; SC2 (wt %) is the solvent content achieved when the film was separated from the support; and t (sec) is the solvent extracting time. (When no support was used in the wet method, the solvent content of the film achieved 10 seconds after introducing the film into the wet bath was adopted as SC2, and 10 sec was adopted the solvent extracting time t.)

The solvent content of a film can be obtained, for example, by immersing the film into water and measuring the amount of the solvent extracted, by gas chromatography, etc. Furthermore, sulfuric acid can be measured by determining the sulfate ions according to a conventional method (for example, see Shin Jikken Kagaku Koza 9 (Maruzen) p. 215).

(6) Flatness

A film of 5 cm square was cut out, allowed to stand in a room of 25° C. and 40% for more than 10 minutes, and placed on a glass sheet, and the swellings at the four corners were measured by a cassette meter and averaged. The average value was evaluated according to the following criterion. The flatness evaluated as ○ or Δ was acceptable.

Swelling: 0 mm to less than 1 mm ○ 1 mm to less than 3 mm Δ 3 mm or more X (7) Flatness after processing A film was set in a metallizing apparatus and treated on one side by glowing in Ar atmosphere of 10$^{-1}$ Torr, and with the 6 atmosphere evacuated to a vacuum of 10$^{-6}$ Torr, Co—Ni alloy (Co 80 wt %, Ni 20 wt %) was vapor-deposited as a 0.1 $\mu$m thick layer using an electron beam by letting the film travel along a drum heated to 120° C.

The vapor-deposited film was slit in a width of 6.35 mm, and installed in a cassette, to make a tape.

The winding style and condition of the tape were observed by a microscope and evaluated according to the following criterion, and the appearance evaluated as ○ or Δ was acceptable.

○ . . . The tape was not curled or deformed in winding style at all.

Δ . . . The tape was slightly curled and deformed in winding style.

X . . . The tape was greatly curled and deformed in winding style.

(8) Electro-magnetic conversion characteristics

The RF output of a tape at 4 MHz relative to that of a reference tape was measured using a deck, and evaluated according to the following criterion, and the characteristics evaluated as ○ or Δ was acceptable.

○ . . . +2 dB or more

Δ . . . 0 to less than +2 dB

X . . . Less than 0 dB

The present invention is described below concretely in reference to examples.

EXAMPLE 1

As aromatic diamine components, 2-chloroparaphenylenediamine corresponding to 85 mol % and 4,4'-diaminodiphenyl ether corresponding to 15 mol % were dissolved into N-methyl-2-pyrrolidone (NMP), and 2-chloroterephthalic acid chloride corresponding to 98.5 mol % was added. The mixture was stirred for 2hrs to complete polymerization. It was neutralized by lithium hydroxide, to obtain an aromatic polyamide solution with a polymer concentration of 10.5 wt %. To the solution, colloidal silica particles with a primary particle size of 45 nm were added by 0.3 wt % based on the weight of the polymer.

The polymer solution was filtered, introduced into the dry process, cast onto an endless belt with a belt temperature of 150° C., heated by hot air of 160° C. at a solvent extracting rate of 0.2 wt %/sec, to evaporate the solvent, and the self-sustainable film obtained was continuously separated from the belt. Then a 50° C. solution of NMP/water=40/60 was blown from the belt side of the film using a nozzle, and the film was introduced into a wet bath of the same composition, for extracting the remaining solvent, the inorganic salt produced by neutralization and impurities for 5 minutes, and furthermore introduced into a 50° C. water bath for 5 minutes, for extraction. In this duration, the film was drawn to 1.2 times in the machine direction (MD). Then, in a tenter, it was drawn to 1.3 times in the transverse direction (TD), while being dried and heat-treated on both sides of the film at 280° C., and gradually cooled, to obtain a 4.4 μm thick film.

The values of orientation degree P obtained by measuring the film at 4 points in the thickness direction by the laser Raman microprobe method were 6.49, 12.53, 9.06 and 7.91 in this order from one side of the film. The (Pmax−Pmin)/Pavr was 0.67, Pa/Pb was 1.1. Pavr was 9.0. The obtained film was evaluated in flatness and found to be as good as ○ without being curled. The heat shrinkage of the film in the machine and transverse directions were respectively 2.4 and 2.3%. The elastic modulus in the machine and transverse directions were respectively 13 and 13 GPa. The elongations in the machine and transverse directions were 45 and 45% respectively. The moisture absorption was 1.5%. The magnetic tape prepared by using the film was as good as ○ in flatness and also as good as ○ in electromagnetic conversion characteristics. The magnetic film could sufficiently withstand recording and reproduction at a recording density 8 kilobytes/mm².

EXAMPLES 2 TO 4

The same solution as used in Example 1 was used and formed into a film as described in Example 1, except that the conditions were as stated in Table 1. In this way, three films were obtained. The evaluation results of the films were as shown in Table 2, and the films were found to be good in all of flatness, flatness during processing and electro-magnetic conversion characteristics.

EXAMPLE 5

Into NMP, 2-chloroparaphenylenediamine corresponding to 100 mol % was dissolved as an aromatic diamine component, and isophthalic acid chloride corresponding to 5 mol % and 2-chloroterephthalic acid chloride corresponding to 93.5 mol % were added to the solution. The mixture was stirred for 2 hours, to complete polymerization. It was neutralized by lithium hydroxide, to obtain an aromatic polyamide solution with a polymer concentration of 9.5 wt %. To the solution, colloidal silica particles with a primary particle size of 45 nm were added by 0.3 wt % based on the weight of the polymer.

The obtained polymer solution was formed into a film as described in Example 1 under the conditions stated in Table 1, to obtain a 10 μm thick film.

The film was 0.55 in (Pmax−Pmin)/Pavr, 1.3 in Pa/Pb and 5.8 in Pavr. The obtained film was evaluated in flatness and found to be as good as ○ without being curled. The magnetic tape prepared by using this film was somewhat curled, and found to be as good as Δ in flatness, and also as good as Δ in electromagnetic conversion characteristics.

EXAMPLE 6

The same polymer solution as used in Example 5 was filtered and cast onto an endless belt. It was immediately introduced into 40 wt % LiCl aqueous solution of 30° C. together with the belt, and the solvent was extracted at a solvent extracting rate of 0.3 wt %/sec. Then, the film was separated from the belt. It was washed in a water bath of 50° C. for 5 minutes and introduced into a tenter, to be dried and heat-treated by hot air of 280° C. on both sides of the film. In this duration, the film was drawn to 1.1 times in the machine direction and 1.2 times in the transverse direction, to obtain an 8.0 μm thick film.

The film was 0.44 in (Pmax−Pmin)/Pavr, 1.2 in Pa/Pb and 8.2 in Pavr. The obtained film was evaluated in flatness, and found to be as good as ○ without being curled. The heat shrinkage of the film in the machine and transverse directions were 1.7 and 1.5% respectively, and the elastic modulus in the machine and transverse directions were 16 and 17 GPa respectively. The elongations in the machine and transverse directions were 30 and 25% respectively, and the moisture absorption was 1.3%. The magnetic tape prepared by using this film was somewhat curled, but was found to be as good as Δ in flatness and as good as ○ in the electromagnetic conversion characteristics.

EXAMPLE 7

Poly-p-phenyleneterephthalamide (PPTA, ηinh=5.8) obtained by polymerizing paraphenylenediamine and terephthalic acid chloride was dissolved in concentrated sulfuric acid with a concentration of 98.5%, to prepare a raw solution with a polymer concentration of 11%. Into the solution, colloidal silica particles with a primary particle size of 45 nm were added by 0.3 wt % based on the weight of the polymer. The raw solution had optical anisotropy. The raw solution was degassed in vacuum while being kept at 60° C.

The polymer was filtered and cast onto an endless belt made of tantalum. In succession, humid air of 85% in relative humidity and 90° C. was blown on the belt, to make the cast polymer solution optically isotropic, and the solution was introduced into 40% sulfuric acid aqueous solution together with the belt and coagulated at a sulfuric acid extracting rate of 1.5 wt %/sec. The film was separated from the belt. Then, the coagulated film was washed in about 30° C. water, neutralized in 1% NaOH aqueous solution, and further was allowed to travel in room temperature water, to be washed. In this duration, the film was drawn to 1.2 times between rolls in the machine direction. Furthermore, while it was drawn to 1.3 times in the transverse direction in a tenter, it was dried and heat-treated at 3500C on both sides of the film, and gradually cooled, to obtain a 5.2 μm thick film.

The film was 0.29 in (Pmax−Pmin)/Pavr, 1.0 in Pa/Pb and 9.9 in Pavr. The obtained film was evaluated in flatness and found to be as good as ○ without being curled. The film was used to prepare a magnetic tape which was found to be as good as ○ in flatness and also as good as ○ in electromagnetic conversion characteristics.

Comparative Example 1

Into NMP, metaphenylenediamine corresponding to 40 mol % and 4,41-diaminodiphenylmethane corresponding to 60 mol % were dissolved as aromatic diamine components, and to the solution, terephthalic acid chloride corresponding to 99 mol % was added. The mixture was stirred for 2 hours, to complete polymerization. It was neutralized by lithium hydroxide, to obtain an aromatic polyamide solution with a polymer concentration of 11 wt %. To the solution, colloidal silica particles with a primary particle size of 45 nm were added by 0.3 wt % based on the weight of the polymer.

The polymer was filtered and introduced into a dry process, to be cast onto an endless belt of 100° C. and heated by 200° C. hot air at a solvent extracting rate of 1.2 wt %/sec, to evaporate the solvent. The obtained self-sustainable film was continuously separated from the belt. Then, the film was introduced into a 50° C. water bath used as a wet bath for extracting the remaining solvent, the inorganic salt produced by neutralization and impurities for 10 minutes. In this duration, the film was drawn between rolls to 1.1 times in the machine direction. Then, in a tenter, it was drawn to 1.1 times in the transverse direction while being dried and heat-treated at 250° C. from on both sides of the film, and gradually cooled, to obtain a 10 μm thick film.

The physical properties of the film were as shown in Table 2. The film was greatly curled and as poor as x in flatness. The heat shrinkage of the film in the machine and transverse directions were 6.2 and 6.5% respectively, and the elastic modulus in the machine and transverse directions were 5.5 GPa respectively. The elongations in the machine and transverse directions were 70 and 65% respectively, and the moisture absorption was 4.0%. The film was processed into a magnetic tape which was remarkably curled and poorly dislocated at the ends in winding style. The electromagnetic conversion characteristic was poor.

Comparative Example 2

The same polymer as used in Example 1 was used and formed into a film as described in Comparative Example 1 under the conditions stated in Table 1. The obtained film was somewhat curled but good in flatness. The prepared magnetic tape was greatly curled and as poor as x in both flatness and electro-magnetic conversion characteristic.

Comparative example 3

The same polymer as used in Example 1 was used and formed into a 9.0 μm thick film as described in Comparative Example 2, except that the thermal fixing was effected from the air side only of the film at 280° C.

The obtained film was greatly curled and poor in flatness, and the magnetic tape prepared from it was also x in flatness and electromagnetic conversion characteristics.

Tables 1 and 2 show the physical properties and evaluation results of Examples and Comparative Examples.

TABLE 1

|  | Belt temperature (° C.) | Drying temperature (° C.) | Solvent extracting rate (wt %/sec) | Drawing ratio (MD/TD) | Thermal fixing temperature (° C.) |
|---|---|---|---|---|---|
| Example 1 | 150 | 160 | 0.2 | 1.2/1.3 | 280 |
| Example 2 | 120 | 120 | 0.08 | 1.2/1.3 | 280 |
| Example 3 | 130 | 160 | 0.6 | 1.2/1.3 | 280 |
| Example 4 | 150 | 160 | 0.05 | 1.1/1.2 | 320 |
| Example 5 | 100 | 150 | 0.1 | 1.1/1.2 | 250 |
| Example 6 | — | — | 0.3 | 1.1/1.2 | 280 |
| Example 7 | — | — | 1.5 | 1.2/1.3 | 350 |
| Comparative Example 1 | 100 | 200 | 1.2 | 1.1/1.1 | 250 |
| Comparative Example 2 | 200 | 220 | 1.1 | 1.2/1.3 | 280 |
| Comparative Example 3 | 200 | 220 | 1.1 | 1.2/1.3 | 280 (one side) |

TABLE 2

|  | Thickness (μm) | (Pmax − Pmin)/Pavr | Pa/Pb | Pavr | Flatness | Flatness after processing | Electromagnetic conversion characteristic |
|---|---|---|---|---|---|---|---|
| Example 1 | 4.4 | 0.67 | 1.1 | 9.0 | ○ | ○ | ○ |
| Example 2 | 5.8 | 0.20 | 1.0 | 8.8 | ○ | ○ | ○ |
| Example 3 | 3.0 | 0.62 | 1.3 | 9.1 | Δ | Δ | ○ |
| Example 4 | 16 | 0.45 | 1.2 | 6.3 | ○ | ○ | ○ |
| Example 5 | 10 | 0.55 | 1.3 | 5.8 | ○ | Δ | Δ |
| Example 6 | 8.0 | 0.44 | 1.2 | 8.2 | ○ | Δ | ○ |
| Example 7 | 5.2 | 0.29 | 1.0 | 9.9 | ○ | ○ | ○ |
| Comparative Example 1 | 10 | 1.1 | 1.6 | 5.5 | X | X | X |
| Comparative Example 2 | 12 | 1.1 | 1.5 | 8.4 | Δ | X | X |
| Comparative Example 3 | 9.0 | 1.2 | 1.6 | 8.7 | X | X | X |

INDUSTRIAL APPLICABILITY

In the production of magnetic recording media, flexible printed boards, capacitors, heat sensitive transfer ribbons, etc. by using a film made of an aromatic polyamide and/or aromatic polyimide excellent in heat resistance and mechanical properties, the present invention allows a film with the ratio between the orientation degree of the front side and that of the back side kept in a certain range and homogeneous in the thickness direction to be used for providing products with excellent durability at high temperature and high humidity in the above applications. Especially when the film is used as a base film for a magnetic recording medium, the magnetic recording medium can have good electromagnetic conversion characteristics even in long-time repeated use at high temperature.

We claim:

1. A film comprising an aromatic polyamide and/or aromatic polyimide satisfying the following relationship:

$(Pmax-Pmin)/Pavr \leq 1.0$ wherein Pmax is the maximum value of the orientation degree obtained from the Raman spectrum in the section direction of the film; Pmin is the minimum value and Pavr is the average value.

2. The film according to claim 1, which satisfies the following relationship:

$Pa/Pb \leq 1.5$ wherein Pa is the average orientation degree of one half obtained by dividing a section of the film at its center line, and Pb is the average orientation degree of a remaining half ($Pa \geq Pb$).

3. The film according to claim 1, wherein $4.0 \leq Pavr \leq 15$.

4. The film according to claim 1, wherein the heat shrinkage at least in one direction at 220° C. is 5% or less.

5. A magnetic recording medium comprising a magnetic layer provided at least on one side of the film defined in claim 1.

6. The magnetic recording medium according to claim 5, wherein the film has a thickness of 6.5 μm or less and a width of 2.3 to 13.0 mm, and the recording density as a magnetic recording medium is 8 kilobytes/mm² or more.

7. The film according to claim 1 made by a dry-wet process with a solvent extraction rate of 0.01 to 1 wt %/sec.

8. The film according to claim 1 made by a wet process with a solvent extraction rate of 0.01 to 10 wt %/sec.

9. A film comprising 1) not less than 50 mol % of a polyamide according to formulae (I) and/or (II):

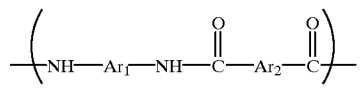

(I)

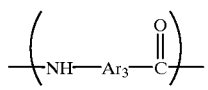

(II)

wherein $Ar_1$, $Ar_2$ and $Ar_3$ represent:

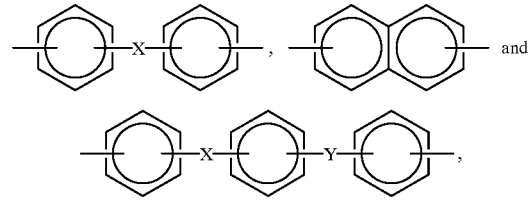 and wherein X and Y represent —O—, —CH$_2$—, —CO—, —SO$_2$—, —S—, and —C(CH$_3$)$_2$—, or 2) not less than 50 mol % of a polyimide according to formulae (III) and/or (IV):

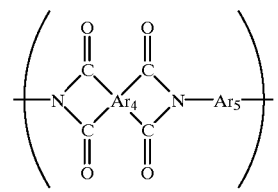

(III)

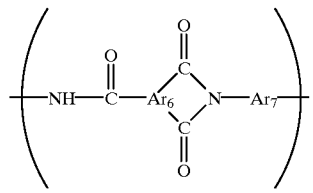

(IV)

wherein $Ar_4$ and $Ar_6$ contain at least one aromatic ring, respectively, and the two carbonyl groups forming the inside ring are bonded to juxtaposed carbon atoms in the aromatic ring, and wherein said polyamide and/or said polyimide satisfy the following relationship:

$(Pmax-Pmin)/Pavr \leq 1.0$ wherein Pmax is the maximum value of the orientation degree obtained from the Raman spectrum in the section direction of the film; Pmin is the minimum value and Pavr is the average value.

10. The film according to claim 9, which satisfies the following relationship:

$Pa/Pb \leq 1.5$ wherein Pa is the average orientation degree of one half obtained by dividing a section of the film at its center line, and Pb is the average orientation degree of a remaining half ($Pa \geq Pb$).

11. The film according to claim 9, wherein $4.0 \leq Pavr \leq 15$.

12. The film according to claim 9, wherein heat shrinkage at least in one direction at 220° C. is 5% or less.

13. A magnetic recording medium comprising a magnetic layer provided at least on one side of the film defined in claim 9.

14. The magnetic recording medium according to claim 13, wherein the film has a thickness of 6.5 μm or less and a width of 2.3 to 13.0 mm, and the recording density as a magnetic recording medium is 8 kilobytes/mm² or more.

15. The film according to claim 13 made by a dry-wet process with a solvent extraction rate of 0.01 to 1 wt %/sec.

16. The film according to claim 13 made by a wet process with a solvent extraction rate of 0.01 to 10 wt %/sec.

* * * * *

UNITED STATES PATENT AND TRADEMARK OFFICE
CERTIFICATE OF CORRECTION

PATENT NO. : 5,969,080
DATED : October 19, 1999
INVENTOR(S) : Toshiya Ieki, Akimitsu Tsukuda and Toshihiro Tsuzuki It is certified that error appears in the above-identified patent and that said Letters Patent is hereby corrected as shown below:

In Column 2, line 26, please change "—C(CH$_3$)2—" to -- —C(CH$_3$)$_2$—--; and line 55, please change "(E)" to --(II)--.

In Column 10, line 37, please change "the 6" to --the--.

In Column 12, line 55, please change "3500C" to --350°C--.

Signed and Sealed this

Twenty-fifth Day of July, 2000

Attest:

Q. TODD DICKINSON

*Attesting Officer*  *Director of Patents and Trademarks*